April 16, 1940. C. M. PETERSEN Re. 21,429

CIRCUIT CONTROL DEVICE

Original Filed Nov. 23, 1934 2 Sheets-Sheet 1

WITNESSES:

Edward Michaels

G. S. Parker

INVENTOR

Carl M. Petersen, Deceased,

BY Westinghouse Electric & Manufacturing Company, Assignee.

BY Ralph H. Swingle

ATTORNEY

April 16, 1940. C. M. PETERSEN Re. 21,429

CIRCUIT CONTROL DEVICE

Original Filed Nov. 23, 1934 2 Sheets-Sheet 2

WITNESSES:
Edward Michaels
G. S. Parker

INVENTOR
Carl M. Petersen, Deceased,
BY Westinghouse Electric & Manufacturing Company, Assignee.
BY Ralph H. Swingle
ATTORNEY Reissued Apr. 16, 1940

Re. 21,429

UNITED STATES PATENT OFFICE 21,429

CIRCUIT CONTROL DEVICE

Carl M. Petersen, deceased, late of Morrisville, Pa., by Westinghouse Electric & Manufacturing Company, assignee, East Pittsburgh, Pa.

Original No. 2,076,385, dated April 6, 1937, Serial No. 754,400, November 23, 1934. Application for reissue March 31, 1939, Serial No. 265,296

25 Claims. (Cl. 200—116

The invention relates to switches or other circuit control devices particularly to devices adapted to be operated manually and automatically to break a circuit.

Devices of the type to which the invention relates are frequently provided with a handle or buttons for operating the same manually to complete or break a circuit and with current controlled means rendered operative when the circuit is completed to be automatically actuated upon overload to break the circuit. The mechanism employed in devices of this character heretofore has embodied a large number of parts and therefore the devices have been complicated, bulky and expensive. Furthermore after the circuit is broken automatically devices of this character have to be reset before they can again be operated manually.

In accordance with the invention these objections are overcome by providing a simple construction embodying a limited number of parts in which the elements may be operated manually after automatic operation without any resetting operation.

One of the objects of the invention is to provide a circuit breaker which is small, simple and inexpensive to produce.

Another object of the invention is to provide a circuit breaker or switch, the elements of which do not have to be reset in order to operate the device manually after automatic operation thereof.

A further object of the invention is to provide a circuit breaker, switch, or toggle operated device having novel actuating means therefor.

These and other objects and features of the invention will appear from the following description thereof in which reference is made to the accompanying figures of the drawings illustrating typical embodiments of the invention.

Figure 1:
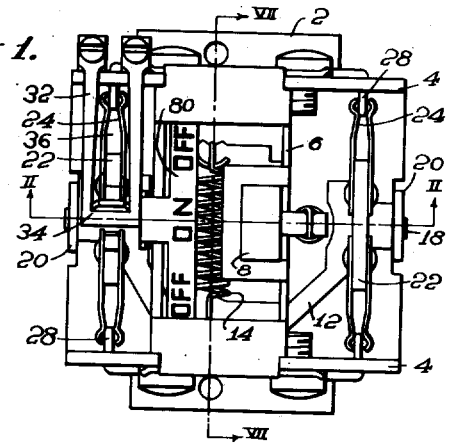
Fig. 1 is a plan view of a preferred form of mechanism embodying the invention.
Figure 11:
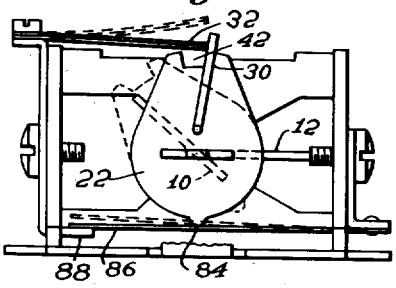
Figure 12:
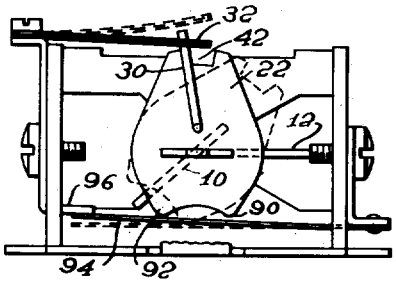

Figs. 3 to 6 inclusive are elevations of the device shown in Fig. 1 as seen from the left of Fig. 1 with the parts in various positions, Figs. 7 to 10 inclusive are sectional views taken on the line 7—7 of Fig. 1, illustrating successive movements of one form of manual operating mechanism, Fig. 11 illustrates an alternative form of mechanism embodying the invention, and;

Fig. 12 illustrates a further alternative form of mechanism embodying the invention.

In that form of the invention chosen for illustration in Figs. 1 to 10 of the drawings, the device comprises a base plate 2 and housing 3 from the face of which projects a single operating member shown as a push button. Two spaced contact carrying plates 4 formed of insulating material are secured in fixed position with respect to the base of plate 2 and extend upwardly therefrom within the housing. A frame 6 mounted upon the base plate 2 is secured to the upper edges of the plates 4 and prevents displacement thereof. The actuating mechanism preferably is operated manually by the push button 8 and as shown includes two toggle-operated members 10 and 12 having a spring 14 interposed between the same. The member 10 serves as a switch actuator and is mounted for movement about pivots 16 in the frame 6 while the contact operating member 12 is mounted for movement about pivots 18 in upstanding brackets 20 carried by the base plate 2. The pivot points 16 and 18 of the members 10 and 12 may be located substantially in alignment if desired but, of course, this arrangement is not essential to operation of the device. Movement of the switch actuator 10 from one position to another carries the adjacent end of spring 14 beyond a plane passing through the pivot points 18 of the contact operating member, and the point of connection of the spring 14 to said member, causing the latter to be moved with snap action from one limiting position to another as in the usual operation of toggle-operated devices.

Movable switch elements for making and breaking a circuit to be controlled by the device are mounted upon insulating plates 22 secured to and movable with the contact operating member 12. The contacts each comprise oppositely extending spring contact fingers 24 joined by a conducting strip 26 so that when moved into engagement with stationary contacts 28 mounted on the insulating plates 4 they bridge the same and complete the circuit as shown in Figs. 3 and 4 which illustrate alternative "on" position of the mechanism.

Figure 3:
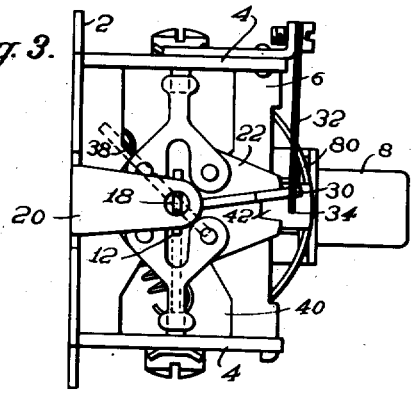
Figure 4:
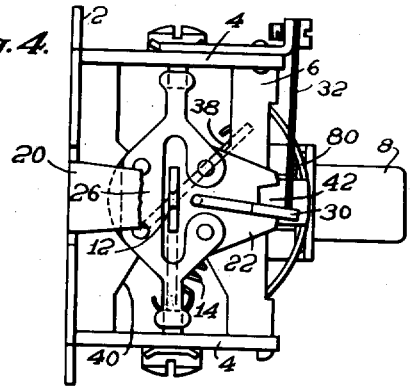
Figure 2:
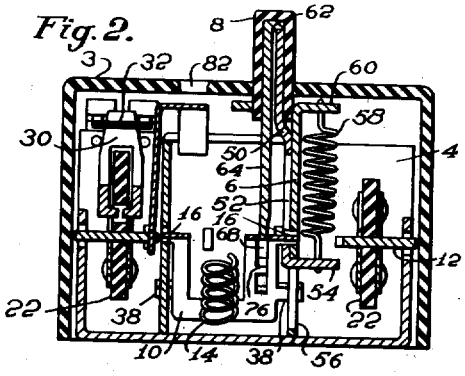
Fig. 2 is a sectional view taken on the line II—II of Fig. 1.
Figure 5:
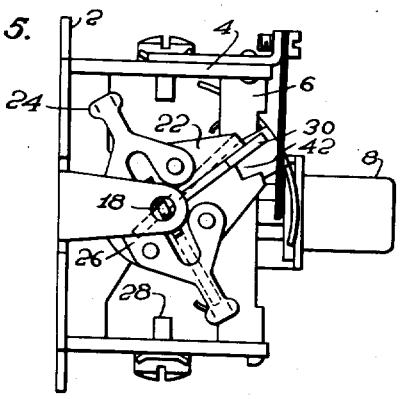

The contact fingers 24 and the operating mechanism therefor are movable back and forth manually from the "off" position of Fig. 5 to the "on" position of Fig. 3. However, the elements are also movable manually back and forth from the "off" position of Fig. 6 to the "on" position of Fig. 4. The parts thus have two alternative paths of movement and are so designed that the switch may be operated manually in one path until an overload in the circuit causes the device to be thrown automatically from the "on" position of one path to the "off" position of the other. Thereafter the device may be operated manually back and forth in the alternative path until it is again actuated automatically to throw it back to the "off" position of the first path. This construction renders it unnecessary to reset the mechanism for further manual operation after an overload has caused the device to be operated automatically.

Figure 6:
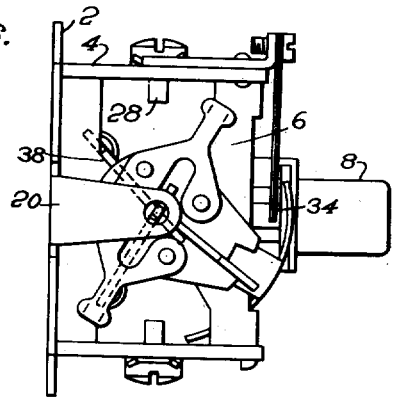

When the contact fingers 24 and operating mechanism are in either of their two "off" positions the members 10 and 12 are both in their extreme raised or extreme lowered position as shown in Figs. 5 and 6. However, when in either of the "on" positions shown in Figs. 3 and 4 the switch actuator member 10 only is in its extreme upper or lower position whereas the contact operating member 12 is held substantially midway between its limiting positions.

In order to hold the member 12 in its central or "on" position with fingers 24 of the bridging contacts in engagement with the stationary contacts 28 on plates 4, there is provided releasable elements comprising a stop member 30 carried by one of the insulating plates 22 and extending therefrom into position to engage or abut a retaining element such as the bimetallic strip 32 supported at one end on one of the insulating plates 4. The free end 34 of the strip 32 is positioned to arrest movement of the contact operating member 12 in its movement from one limiting position to the other and when the movable switch elements have been brought into enegagement with stationary contacts 28 to complete the circuit. The strip 32 is formed with a slot 36 into which the stop 30 extends when the contact operating member 12 is in the "on" position of Fig. 3. When in this position the stop engages the inner edge of the material at the end 34 of the slot 36. The contact operating member 12 is then in its central position while the switch actuator 10 is in its limiting position with lugs 38 on the actuator engaging the inclined surface 40 on the left side of the frame to limit the movement thereof. When in the other "on" position shown in Fig. 4 the stop member 30 engages the outer end of the strip 32, the contact operating member 12 is in its central position, and the switch actuator 10 is in its limited position with lug 38 in engagement with the inclined surface 40 on the right side of frame 6 to limit movement thereof.

When in either "on" position with the contact moving member held in its central position by stop 30 and retaining element 32, the spring 14 is under tension so that the contact operating member is continually urged toward one or the other of its "off" positions depending upon the location of the stop 30 with respect to the end 34 of the bimetallic strip. Release of the stop member by upward movement or flexing of the bimetallic strip 32 will therefore operate to release the contact operating member for continued movement to a limiting position. The contact moving member and spring contact fingers will be then moved with snap action into one or the other of their "off" positions under the residual tension of the spring 14.

Release of the latch or retaining mechanism in the construction shown takes place upon flexing or upward movement of the strip 32 but it will be apparent that the desired releasing of the stop member may be effected by any suitable means operated in response to an overload in the circuit as by energizing a solenoid, fusing of a low melting point connection or the operation of other current controlled means. Preferably a bimetallic strip is included in series in the circuit to be controlled so as to be heated by the passage of current through the same. The passage of normal current does not cause the metal to be heated and flexed to a sufficient extent to release the stop 30 but upon the passage of an excess of current the heat generated is sufficient to cause the strip to flex upwardly sufficiently to disengage the end 34 of the strip from the stop member and release the contact operating member for continued movement so that the circuit will be broken automatically.

Since it is desirable to cause the spring contact fingers 24 to assume the same position when the parts are moved to either of the "on" positions of Fig. 3 or Fig. 4 the stop 30 preferably is movable to a limited extent with reference to the plate 22. This movement may be effected by mounting the stop for movement on plate 22 with a portion thereof extending into a slot 42 so as to provide the necessary lost motion required to bring the contact fingers into the same position when strip 32 and the stop 30 are in either of their "on" positions.

In order to effect manual operation of the switch actuator to move the contact operating member and contacts from one position to another, any suitable mechanism such as one or more push buttons, turn buttons, levers, or the like may be used as desired. The form of mechanism hereinafter described for this purpose is preferred however, since it embodies only a single push button and is simple and effective in its operation. Furthermore the operating mechanism hereafter described is also applicable for use in the operation of other devices or mechanism requiring rocking movement for its operation, such as switches, circuit breakers, toggle-operated mechanism or other devices.

Figure 7:
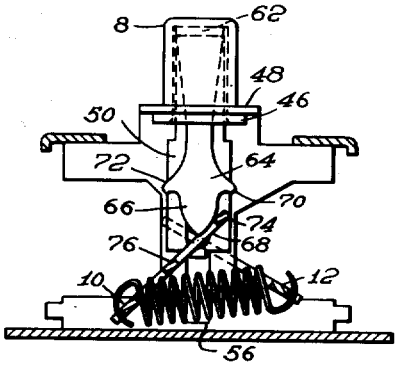
Figure 8:
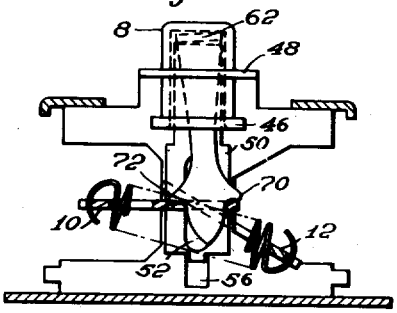
Figure 9:
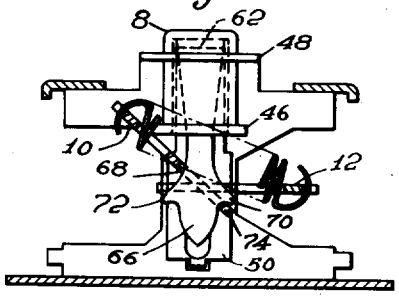
Figure 10:
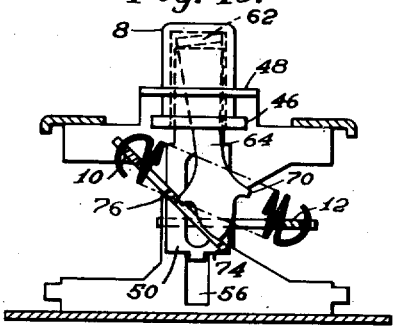

As shown in Fig. 7 the actuating mechanism comprises a hollow push botton 8 provided with a bead or projection 46 extending beneath an inturned portion 48 on the frame 6 to prevent upward displacement or removal of the button from the device. The button is continually urged upwardly by slide 50 which extends downwardly adjacent frame 6 and is formed with a slot 52 through which the pivot bearing 16 of the switch actuator extends. A lug 54 on the slide projects through an opening 56 in the frame and has a spring 58 secured thereto, the upper end of which spring is attached to a projection 60 extending outwardly from the top of frame 6 so that the spring urges the slide 50 and button 8 upwardly to cause the button to return to its raised or projected position as soon as it is released.

The upper end of slide 50 extends into button 8 and bears against the inturned upper end 62 of an operating member 64 holding it in raised position within the button. Since the inturned end 62 of member 64 is flat and bears against the flat inner surface of the button 8 it normally assumes a central position but is yieldably supported to enable the lower end thereof to swing to either side against the action of spring 58 and return to a central or operative position preparatory for operation of the switch actuator. The lower end or head 66 of the operating member is arranged to pass into a slot 68 in the switch actuator 10 when the push button is depressed. Projecting engaging elements 70 and 72 extend from the opposite sides of the head to engage cooperating elements 74 and 76 carried by the switch actuator and located on opposite sides of the pivot point 16 thereof.

When in the raised position with the switch actuator in its extreme upper position as shown in the position of Fig. 7 the engaging element 70 on the right side of head 66 is located above the cooperating element 74 on the right side of pivot 16. With the parts in this position downward movement of the button and operating member will bring projecting engaging element 70 into engagement with cooperating element 74 and move the right side of the switch actuator downward about its pivot. The head 66 travels with the element 74 and therefore moves in an arcuate path about pivot 16 to the position of Fig. 8. The oppositely extending element 72 on the head will thus be moved out of the path of the cooperating element 76 at the opposite end of slot 68 as it moves upward about pivot 16. When the switch actuator is moved down far enough to cause spring 14 to carry it over to its other limiting position the operating member again assumes a central position due to the action of spring 58. Upon release of the push button the slide and operating member move upward under the action of spring 58 and the inclined upper face of element 72 engages the under side of cooperating element 76 causing the head to swing out of the way as it moves upward. As the engaging element 72 moves up beyond the element 76 the operating member again swings back to its operative position with element 72 above the cooperating element 76 into position to operate the switch actuator in the reverse direction upon succeeding operation of the push button. The engaging elements on the operating element thus move in parallel paths on opposite sides of the pivot 16 alternately to engage the cooperating elements on the switch actuater on successive movements of the operating member and when the switch actuator is in either position.

With this construction the push button 8 may be operated at any time to move the switch actuator manually from one position to another without resetting the device and without the provision of more than a single operating button or device. In order to indicate the position of the contacts at all times the device is preferably provided with an indicator 80 carried by the contact operating member 12 and visible through an opening 82 in the casing.

In the operation of the form of the invention described above the push button 8 may be depressed as desired to move the switch actuator back and forth from one limiting position to the other. The switch operating member is energized for movement in the same manner but its movement is arrested in an intermediate position by the releasable elements or latch mechanism shown as a bimetallic strip 32 and the stop member 30. Manual operation of the device during the persistence of normal current conditions therefore will cause the contact operating member and switch element to move between one limiting position to the intermediate position. When in their "on" position an overload of the circuit will cause the latch mechanism to release the contact operating member as when the bimetallic strip 32 is flexed upwardly due to overheating thereof. The residual tension in spring 14 then causes the contact operating member and the contacts 24 to be moved automatically and rapidly to a new "off" position breaking the circuit. Subsequent manual operation of the device will then move the contact operating member and contacts 24 back between their new "off" and "on" positions through a different path of movement until the device is again actuated in response to an overload when the elements will return to their initial "off" position.

While it will be apparent that mechanism embodying the invention may be varied greatly in form and construction it is desired to direct particular attention to the possibilities presented in the application of the invention to devices such as manually and automatically operated circuit control devices in which the switch element does not move in opposite directions from the stationary contact when the device is operated manually and automatically. Furthermore the movable switch element employed in those constructions shown in Figs. 11 and 12 is not actuated by the spring 14 which causes the contact operating member to snap over from one position to another but by separate spring means such as the resiliency of the switch element itself.

As shown in Fig. 11 the contact operating member is provided with an insulating plate 22 having a single projection 84 positioned to engage the resilient switch element 86 and move the same toward the stationary contact 88 when the switch operating member is moved to the full line position in which the circuit is completed from the dotted line position in which the circuit is broken. The element 86 is normally biased for movement away from stationary contact 88. Release of the switch operating member due to an overload of the circuit will therefore cause said member to be moved past the intermediate circuit closing position to a new "off" position and switch element 84 will move away from the stationary contact breaking the circuit. The device may then be operated manually as before without resetting of the mechanism.

In a similar way the construction of Fig. 12 provides an insulating plate 22 movable with the contact operating member but provided with two projections 90 and 92 movable to engage a resilient switch element 94 which is normally biased for movement toward the stationary contact 96. Movement of the contact operating member to its intermediate position shown in full lines in Fig. 12 therefore causes the projections 90 and 92 to move out of engagement with the switch element so that the circuit will be closed by the spring movement of the switch element itself. Manual operation of the contact operating member and plate 22 causes the plate to rotate bringing one of the projections into engagement with the switch element to move the same away from stationary contact 96 while automatic operation of the device in response to abnormal current conditions will cause the plate 22 to rotate in the opposite direction bringing the other of the projections 90 and 92 into engagement with the switch element to break the circuit as shown in dotted lines in Fig. 12. As in the other forms of the invention described above manual operation of the device may take place at all times without resetting of the mechanism so that its operation is made extremely simple and fool-proof.

Although there is herein shown and described certain preferred forms of mechanism embodying the invention to illustrate typical constructions in which it may be employed it should be understood that devices embodying the invention may be altered considerably in construction and operation from those specifically described without departing from the spirit and scope thereof.

The invention claimed is as follows:

1. In a circuit interrupter, a contact, a movable switch element, an oscillatable contact operating member for moving said switch element to closed position in engagement with said contact and to open circuit position away from said contact, said contact operating member being movable back and forth between two limiting positions, snap acting means for actuating said contact operating member, means normally operable to arrest movement of said contact operating member in an intermediate position in which said switch element is in closed circuit position when said contact operating member is moved from either of its limiting positions toward the other, and current responsive means operable upon overload to release said member for movement to circuit breaking position.

2. In a circuit interrupter, a contact, a cooperating movable switch element, an oscillatable contact operating member movable back and forth between two limiting positions for causing said switch element to be moved out of engagement with said contact when said member is moved to either limiting position and for causing said switch element to be moved to closed circuit position in engagement with said contact when said member is moved to an intermediate closed position between its limits of movement, snap acting means operable to move said contact operating member from either limiting position to the other, movable retaining means for arresting movement of said contact operating member in its intermediate closed position irrespective of the direction in which said contact operating member is moved, and current controlled means operable on overload of the circuit to release said contact operating member for movement to circuit breaking position.

3. In a circuit interrupter, a contact, a cooperating movable switch element, an oscillatable contact operating member movable on a pivot back and forth between two limiting positions for causing movement of said switch element out of engagement with said contact to break said circuit when said member is moved to either of its limiting positions and for causing movement of said switch element to closed circuit position in engagement with said contact when said member is moved to an intermediate position between its limits of movement, snap acting means operable to move said contact operating member about its pivot in a continuous movement from either limiting position to the other, movable retaining means for arresting movement of said contact operating member in said intermediate position irrespective of the direction in which said contact operating member is moved, and means operable in response to predetermined conditions to release said member for continued movement to circuit breaker position.

4. A circuit controlling device having in combination, a contact, a cooperating movable switch element, an oscillatable contact operating member movable back and forth between two limiting positions for causing movement of said switch element out of engagement with said contact when said member is moved to either of its limiting positions and for causing movement of said switch element to closed circuit position in engagement with said contact when said member is moved to an intermediate position between its limits of movement, spring means operable to move said member from either limiting position to the other, manually operable means for actuating said spring means to move said contact operating member in either direction, movable retaining means for arresting movement of said contact operating member in said intermediate position when said contact operating member is moved from either of its limiting positions toward the other, and means operable in response to predetermined conditions to release said member for movement to break said circuit.

5. A circuit control device having in combination, a contact, a cooperating movable switch element, a contact operating member movable on a pivot back and forth between two limiting positions for causing movement of said switch element out of engagement with said contact to break the circuit when said member is moved to either of its limiting positions and for causing movement of said switch element to closed circuit position in engagement with said contact when said member is moved to an intermediate position between its limits of movement, spring means operable to move said contact operating member about its pivot in a continuous movement from either limiting position to the other, retaining means for arresting movement of said contact operating member in said intermediate position when said member is moved from either of its limiting positions toward the other, current controlled means operable upon overload of the circuit to release said member for continued movement to circuit breaking position, and manually operable means for actuating said spring to cause movement of said contact member back or forth between either of its limiting positions and said intermediate position.

6. A circuit controlling device comprising relatively movable contacts, an oscillatable contact operating member movable back and forth between two limiting positions for causing opening of said contacts when said member is moved to either of its limiting positions and for causing closing of said contacts when said member is moved to an intermediate position between its limits of movement, spring means for moving said contact operating member, releasable retaining means for arresting movement of said contact operating member in said intermediate position when said member is moved from either limiting position toward the other, said spring means being operable when said member is released by said retaining means to move said member on to a limiting position to cause automatic opening of said contacts, manually operable means for reversibly operating said spring means to move said contact operating member between either of its limiting positions and said intermediate position to open or close said contacts manually, and current responsive means operable in response to predetermined conditions to cause said retaining means to release said contact operating member for movement to automatically open said contacts.

7. A circuit control device comprising relatively movable contacts, an oscillatable contact operating member movable to and fro between two limiting positions for causing opening of said contacts when said member is moved to either of its limiting positions and for causing closing of said contacts when said member is moved to an intermediate position between its limits of movement, spring means for actuating said member in either direction, current controlled means for limiting movement of said member to oscillation thereof between one limiting position and said intermediate position and operable in response to predetermined conditions to release said contact operating member for movement thereof to the other limiting position and for then limiting movement of said member between said last mentioned limiting position and said intermediate position until it again releases said member for movement to said one limiting position in response to predetermined conditions.

8. A circuit control device having in combination, relatively movable contacts, oscillatable contact operating means movable back and forth between two limiting positions for causing opening of said contacts when said means is moved to either limiting position and for causing closing of said contacts when said means is moved to an intermediate position, retaining means positioned during the persistence of normal current conditions to limit movement of said contact operating means to oscillation thereof between either limiting position and said intermediate position, current responsive means operable upon overload to release said contact operating means for movement to cause automatic opening of said contacts, and manually operable means for moving said contact operating means between either limiting position and said intermediate position for opening and closing said contacts manually.

9. A circuit control device having in combination, relatively movable contacts, mechanism for actuating said contacts comprising an oscillatable contact operating member movable back and forth between two limiting positions for causing opening of said contacts when said member is moved to either limiting position and for causing closing of said contacts when said member is in an intermediate position, retaining means for arresting movement of said contact operating member in said intermediate position when said member is moved from either limiting position toward the other, manually operable means for moving said member between either limiting position and said intermediate position to open or close said contacts manually, and elements including a spring and current responsive means operable upon overload to release said contact operating member and move the same to circuit breaking position.

10. A circuit interrupter having in combination, relatively movable contacts, mechanism for actuating said contacts comprising an oscillatable contact operating member pivoted on a support and rotatable back and forth between two limiting positions for causing opening of said contacts when said member is moved to either limiting position and for causing closing of said contacts when said member is moved to an intermediate position, an oscillatable actuator also pivoted on a support and movable back and forth between two limiting positions, a spring interposed between said actuator and said contact operating member to cause said member to snap over from one position to another upon movement of said actuator beyond predetermined positions, retaining means for arresting movement of said contact operating member and retaining the same in said intermediate position when said member is moved from either limiting position toward the other, manually operable means for moving said actuator to move said contact operating member between either limiting position and said intermediate position to operate said contacts manually, and current responsive means operable on overload to release said contact operating member for movement to open said contacts automatically.

11. A circuit interrupter comprising an oscillatable switch element movable back and forth between two limiting positions, a contact located between the limits of movement of said switch element to be engaged thereby in an intermediate position of said element, retaining means for arresting movement of said switch element in said intermediate position in engagement with said contact irrespective of the direction of movement of said switch element, and current controlled means operable upon abnormal current conditions to release said switch element for movement out of engagement with said contact to break the circuit.

12. A circuit control device comprising an oscillatable switch element movable back and forth between two limiting positions, a contact disposed between the limits of movement of said switch element to be engaged thereby in an intermediate position of said switch element, means including spring means and current controlled means for releasably retaining said switch element in said intermediate position in engagement with said contact when said member is moved from either of its limiting positions toward the other, and manually operable means for moving said switch element into and out of engagement with said contact.

13. A circuit interrupter having in combination, relatively movable contacts, an oscillatable contact operating member movable back and forth between two limiting positions for opening said contacts when said member is moved to either limiting position and for closing said contacts when said member is moved to an intermediate position between its limits of movement, means for normally arresting movement of said contact operating member in said intermediate position when said member is moved from either of its limiting positions toward the other, said means being operable in response to predetermined conditions to release said member for movement to cause opening of said contacts.

14. A circuit control device having in combination a contact, a switch element movable into and out of engagement with said contact and actuating means for said switch element comprising a switch actuator movable in opposite directions about a pivot from one position to another, manually operable means movable toward and away from said pivot in an operating stroke during which said actuator is operated and movable in a return stroke to restore the same to an operative position, a spring urging said manually operable means toward said operative position, engaging elements movable by said means in paths passing on opposite sides of said pivot and cooperating elements located on opposite sides of said pivot and alternately movable by said switch actuator into the path of movement of one of said engaging elements upon movement of said manually operable means from said operative position.

15. A circuit control device having in combination a contact, a switch element movable into and out of engagement with said contact and actuating means for said switch element comprising a switch actuator operatively connected to the switch element and movable in opposite directions on a pivot from one position to another, manually operable means movable in an operating stroke in one direction to operate said switch actuator and movable in a return stroke in the opposite direction independently of said actuator into an operative position, engaging elements carried by said manually operable means and located in spaced relation thereon to move with said means in parallel paths on opposite sides of said pivot, cooperating elements movable by said actuator located on opposite sides of said pivot and alternately movable upon successive movements of said switch actuator into the path of movement of one of said engaging elements when said manually operable means is in said operative position and spring means urging said manually operable means to said operative position.

16. A circuit control device having in combination a contact, a switch element movable into and out of engagement with said contact and actuating means for said switch element comprising a switch actuator movable on a pivot from one position to another, manually operable means movable in one direction to operate said switch actuator and movable in the opposite direction independently of said actuator to an operative position engaging elements movable by said manually operable means, cooperating elements movably by said actuator and located on opposite sides of said pivot, said cooperating elements being alternately movable by said actuator into a rest position in the path of movement of a different engaging element upon successive movements of said means to operate said actuator.

17. A circuit control device having in combination a contact, a switch element movable into and out of engagement with said contact and actuating means for said switch element comprising a switch actuator movable in opposite directions about a pivot from one position to another, manually operable means movable toward and away from said pivot in an operating stroke during which said switch actuator is operated and in a return stroke independently of said actuator to restore the same to an operative position, two engaging elements movable by said manually operable means in parallel paths passing on opposite sides of said pivot, cooperating elements movable by said switch actuator located on opposite sides of said pivot and alternately movable into rest position in the path of movement of different engaging elements, said engaging elements being yieldably supported to enable the same to travel in an arcuate path about said pivot when said engaging and cooperating elements are moved by said means and formed with inclined upper surfaces to cause said elements to be displaced upon engagement with said cooperating elements to permit free return movement of said means to said operating position, and spring means urging said manually operable means toward said operative position.

18. In a circuit interrupter, relatively movable contacts, an oscillatable contact operating member movable back and forth between two limiting positions for causing opening of said contacts when said member is moved to either limiting position and for causing closing of said contacts when said member is moved to an intermediate closed position between its limits of movement, means including a spring operable to move said contact operating member in either direction, movable retaining means for normally arresting movement of said contact operating member in its intermediate closed position when said member is moved from either limiting position toward the other, and current controlled means operable in response to predetermined conditions to release said contact operating member for movement to circuit breaking position.

19. In a circuit interrupter, relatively movable contacts, a releasable and resettable operating mechanism operable manually to open or to close said contacts and operable when released to cause automatic opening of said contacts, current responsive means operable in response to predetermined conditions to effect release of said mechanism to cause automatic opening of said contacts, and a manually operable handle movable in the same direction to cause said mechanism to open or to close said contacts, and also movable in the same direction after release of said mechanism to reset said mechanism.

20. In a circuit interrupter, relatively movable contacts, a releasable and resettable operating mechanism operable manually to open or to close said contacts and operable when released to cause automatic opening of said contacts, current responsive means operable in response to predetermined conditions to effect release of said mechanism to cause automatic opening of said contacts, and a manually operable handle movable in the same direction to cause said mechanism to open or to close said contacts, and also movable in the same direction following release of said mechanism to reset said mechanism and simultaneously cause said mechanism to reclose said contacts.

21. In a circuit interrupter, relatively movable contacts, a releasable and resettable operating mechanism operable manually to open or to close said contacts and operable when released to cause automatic opening of said contacts, current responsive means operable in response to predetermined conditions to effect release of said mechanism to cause automatic opening of said contacts, said mechanism including a manually operable handle biased to a normal position and movable in one direction to open said contacts and in the same direction to close said contacts, and movable also in the same direction following release of said mechanism to reset said mechanism and to simultaneously reclose said contacts.

22. In a circuit interrupter, relatively movable contacts, a releasable and resettable operating mechanism operable manually to open or to close said contacts and operable when released to cause automatic opening of said contacts, current responsive means operable in response to predetermined conditions to effect release of said mechanism to cause automatic opening of said contacts, said mechanism including a manually operable push button handle biased to a normal position and movable in the same direction to cause opening or closing of said contacts, and movable also in the same direction following release of said mechanism to reset said mechanism and simultaneously reclose said contacts.

23. In a circuit interrupter, relatively movable contacts, a releasable and resettable operating mechanism operable manually to open or to close said contacts and operable when released to cause automatic opening of said contacts, current responsive means operable in response to predetermined conditions to effect release of said mechanism to cause automatic opening of said contacts, said mechanism including a manually operable handle biased to a normal position and movable in one direction to open said contacts and in the same direction to close said contacts, and movable also in the same direction following release of said mechanism to reset said mechanism and to simultaneously reclose said contacts, and indicating means operable by said mechanism for indicating the position of said contacts.

24. A circuit interrupter having in combination, relatively movable contacts, an oscillatable contact operating member movable back and forth between two limiting positions for causing opening of said contacts when said member is moved to either limiting position and for causing closing of said contacts when said member is moved to an intermediate position between its limits of movement, releasable retaining means engageable by said member for arresting movement of said member in said intermediate position when said member is moved from either of its limiting positions toward the other current controlled means operable in response to predetermined conditions to release said member for movement to open said contacts automatically, operating means operable manually to move said member between either limiting position and said intermediate position to open or close said contacts manually, and operable automatically to move said member when said member is released to cause automatic opening of said contacts, said operating means including a manually operable handle biased to a normal position and movable in one direction to cause said mechanism to close said contacts and movable in the same direction to cause said mechanism to open said contacts.

25. In a circuit interrupter, relatively movable contacts, an operating mechanism operable manually to normally open and to normally close said contacts, current responsive means operable in response to predetermined conditions to effect operation of said mechanism to cause automatic opening of said contacts, and a manually operable handle movable in one direction to cause said mechanism to normally open said contacts and movable in the same direction to cause said mechanism to normally close said contacts, and also movable in the same direction after current responsive operation of said mechanism to reclose said contacts.

WESTINGHOUSE ELECTRIC &
MANUFACTURING COMPANY,
*Assignee of Carl M. Petersen, Deceased.*
By R. B. MILDON,
*Vice President.*